US010339397B2

(12) United States Patent
Lin et al.

(10) Patent No.: US 10,339,397 B2
(45) Date of Patent: Jul. 2, 2019

(54) DETECTING DEVICE, DETECTING METHOD, AND PROGRAM

(71) Applicant: International Business Machines Corporation, Armonk, NY (US)

(72) Inventors: Ching-Yung Lin, Scarsdale, NY (US); Masayuki Murata, Tokyo (JP); Shuichi Shimizu, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/720,444

(22) Filed: Sep. 29, 2017

(65) Prior Publication Data

US 2018/0025236 A1    Jan. 25, 2018

Related U.S. Application Data

(63) Continuation of application No. 14/870,597, filed on Sep. 30, 2015, now Pat. No. 9,798,938.

(30) Foreign Application Priority Data

Sep. 30, 2014 (JP) .................. 2014-200155

(51) Int. Cl.
*G06K 9/00* (2006.01)
*G06T 7/70* (2017.01)
(Continued)

(52) U.S. Cl.
CPC ....... *G06K 9/00805* (2013.01); *G06K 9/6202* (2013.01); *G06T 7/70* (2017.01);
(Continued)

(58) Field of Classification Search
CPC .......... G06K 9/00805; G06K 9/00624; G06K 9/00791; G06K 9/00798; G06T 7/593;
(Continued)

(56) References Cited

U.S. PATENT DOCUMENTS 7,786,898 B2    8/2010  Stein et al.
8,378,851 B2    2/2013  Stein et al.
(Continued)

FOREIGN PATENT DOCUMENTS

JP    H04161810 A    6/1992
JP    H1038561 A     2/1998
(Continued)

OTHER PUBLICATIONS

Achanta et al., "SLIC Superpixels Compared to State-of-the-Art Superpixel Methods," Short Papers, IEEE Transactions on Pattern Analysis and Machine Intelligence, Nov. 2012, pp. 2274-2281, vol. 34, No. 11.

(Continued)

*Primary Examiner* — Bhavesh M Mehta
*Assistant Examiner* — Ian L Lemieux
(74) *Attorney, Agent, or Firm* — Jay Wahlquist

(57) ABSTRACT

To detect a distant object that may become an obstacle to a traveling destination of a moving vehicle or the like more accurately than the conventional, there is provided a detecting device, a program used in the detecting device, and a detecting method using the detecting device, where the detecting device includes: an acquisition section for acquiring two or more images captured in two or more imaging devices provided at different heights; and a detection section for detecting a rising portion of an identical object toward the imaging devices based on a difference between the lengths of the identical object in the height direction in the two or more images.

1 Claim, 7 Drawing Sheets

(51) Int. Cl.
*G06K 9/62* (2006.01)
*G06T 7/73* (2017.01)

(52) U.S. Cl.
CPC ...... *G06T 7/74* (2017.01); *G06T 2207/10021* (2013.01); *G06T 2207/30261* (2013.01)

(58) Field of Classification Search
CPC . G06T 2207/30252; G06T 2207/30261; G06T 2207/10012; G06T 2207/20224; G06T 2207/30256; G06T 7/536; G06T 7/55
See application file for complete search history.

(56) References Cited

U.S. PATENT DOCUMENTS

| | | |
|---|---|---|
| 2004/0096082 A1 | 5/2004 | Nakai et al. |
| 2005/0196034 A1 | 9/2005 | Hattori et al. |
| 2006/0115119 A1 | 6/2006 | Nagaoka et al. |
| 2006/0204037 A1 | 9/2006 | Watanabe et al. |
| 2009/0010495 A1 | 1/2009 | Schamp et al. |
| 2009/0015675 A1 | 1/2009 | Yang |
| 2009/0262192 A1 | 10/2009 | Schofield et al. |
| 2010/0165113 A1* | 7/2010 | Abe ............... G06K 9/6203 348/169 |
| 2013/0250070 A1 | 9/2013 | Takamaya |
| 2015/0036887 A1 | 2/2015 | Allezard et al. |
| 2015/0234045 A1 | 8/2015 | Rosenblum et al. |
| 2015/0249821 A1 | 9/2015 | Tanizumi et al. |
| 2015/0356358 A1 | 12/2015 | Okada |
| 2016/0093057 A1 | 3/2016 | Lin et al. |
| 2016/0207533 A1 | 7/2016 | Uechi et al. |
| 2016/0304098 A1 | 10/2016 | Ito et al. |
| 2017/0017839 A1 | 1/2017 | Hiramatsu et al. |
| 2017/0076163 A1 | 3/2017 | Lin et al. |

FOREIGN PATENT DOCUMENTS

| | | |
|---|---|---|
| JP | 10-143799 A | 5/1998 |
| JP | 10-283462 A | 10/1998 |
| JP | 11-14346 A | 1/1999 |
| JP | 2005217883 A | 8/2005 |
| JP | 2007-232389 A | 9/2007 |
| JP | 2009282736 A | 12/2009 |

OTHER PUBLICATIONS

Williamson, T., "A High-Performance Stereo Vision System for Obstacle Detection," Dissertation for the degree of Doctor of Philosophy, Sep. 25, 1998, 161 pages, Robotics Institute, Carnegie Mellon University, Pittsburgh, PA.

Decision to Grant a Patent, JP Patent Application No. 2014-200155, dated May 24, 2016.

Lin et al., "Detective Device, Detecting Method, and Program," U.S. Appl. No. 15/720,398, filed Sep. 29, 2017.

Lin et al., "Detective Device, Detecting Method, and Program," U.S. Appl. No. 15/720,500, filed Sep. 29, 2017.

List of IBM Patents or Patent Applications Treated as Related, Sep. 28, 2017, 2 pages.

* cited by examiner

DETECTING DEVICE, DETECTING METHOD, AND PROGRAM

BACKGROUND

Technical Field

The present invention relates to a detecting device, a detecting method, and a program.

Description of the Related Art

Methods of detecting an obstacle to a car or the like by using the parallax of a stereo camera are known (for example, Patent Literatures 1 to 4). However, in the conventional methods, since the parallax becomes smaller as the distance to an object increases, the distant obstacle cannot be detected accurately. For example, since a speed-limit sign or the like painted on a road surface is processed to be identical to the road surface, it is not detected as an obstacle by mistake (i.e., no false alarm). On the other hand, since a distant obstacle appears small, the obstacle is often overlooked (false negative) because of no great difference from the road surface.

CITATION LIST (Patent Literature 1) Japanese Patent Application Publication No. H04-161810.
(Patent Literature 2) Japanese Patent Application Publication No. 2009-282736.
(Patent Literature 3) Japanese Patent Application Publication No. 2005-217883.
(Patent Literature 4) Japanese Patent Application Publication No. H10-38561.

SUMMARY

It is an object of the present invention to detect a distant object likely to become an obstacle accurately.

In a first aspect of the present invention, there are provided a detecting device, a program used in the detecting device, and a detecting method using the detecting device, where the detecting device includes: an acquisition section for acquiring a plurality of images captured in a plurality of imaging devices provided at different heights; and a detection section for detecting a rising portion of an identical object toward the imaging devices based on a difference between the lengths of the identical object in the height direction in the plurality of images.

It should be noted that the above summary of the invention does not recite all the features of the present invention, and subcombinations of these feature groups can also be inventions.

BRIEF DESCRIPTION OF THE DRAWINGS

FIG. 6 shows an example of two or more images captured by two or more imaging devices and the like.

DETAILED DESCRIPTION

While the present invention will be described in connection with a preferred embodiment thereof, the following embodiment is not intended to limit the inventions according to the appended claims. Further, all the combinations of the features described in the embodiment are not necessarily essential to the means for solving the problem in the present invention.

Figure 1:
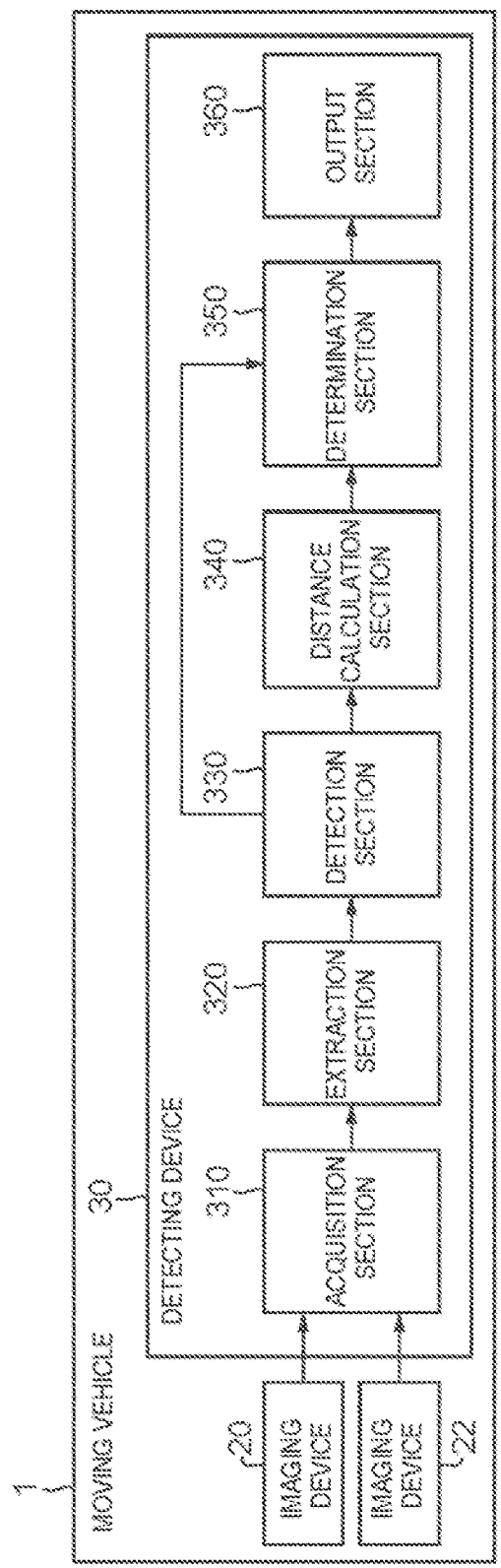
FIG. 1 shows a block diagram of a moving vehicle with a detecting device of an embodiment mounted therein.

FIG. 1 shows a block diagram of a moving vehicle 1 that carries a detecting device 30 according to the embodiment. For example, the moving vehicle 1 may be an auto car, a bicycle, a car such as a rail car, a ship, an airplane, or the like, which uses two or more imaging devices to detect an obstacle that obstructs the traveling. In the embodiment, the description will be made of a case where the moving vehicle 1 is an auto car. The detecting device 30 detects a line segment or a plane portion (also called a rising portion) rising toward the moving direction of the moving vehicle 1 to detect an obstacle. The moving vehicle 1 includes an imaging device 20, an imaging device 22, and the detecting device 30.

The imaging devices 20 and 22 may be digital cameras provided at different heights in the moving vehicle 1. For example, the imaging devices 20 and 22 are so provided that the imaging direction will face toward the moving direction of the moving vehicle 1 to generate images, each of which is obtained by capturing a road surface in the moving direction of the moving vehicle 1, respectively. As an example, the imaging device 20 may be arranged near the rearview mirror of the auto car and the imaging device 22 may be arranged near the front license plate of the auto car. The imaging device 20 and the imaging device 22 provide the captured images to the detecting device 30.

The detecting device 30 detects obstacles in the moving direction of the moving vehicle 1 based on two or more images captured by the two or more imaging devices 20 and 22. The detecting device 30 has an acquisition section 310, an extraction section 320, a detection section 330, a distance calculation section 340, a determination section 350, and an output section 360.

The acquisition section 310 acquires the two or more images captured by the two or more imaging devices 20 and 22. The acquisition section 310 supplies the acquired two or more images to the extraction section 320.

The extraction section 320 extracts candidates for obstacles from some of the two or more images. For example, the extraction section 320 may extract, as the obstacle candidate, a region different in feature such as luminance from the surrounding regions in one of the two or more images (e.g., an image from the imaging device 20). The extraction section 320 supplies the extracted obstacle candidate to the detection section 330.

The detection section 330 detects an object having a portion rising toward the moving vehicle 1 from the two or more images. For example, from an image (e.g., an image from the imaging device 22), unused to extract the obstacle candidate among the two or more images, the detection section 330 detects a region similar to the extracted obstacle candidate to identify the region as an identical object corresponding to an identical obstacle candidate captured in common by the two or more imaging devices.

Then, based on a difference in terms of the length of the identical object in the height direction in the two or more images, the detection section 330 detects a rising portion of the identical object toward the imaging device 20 or the like. A specific detecting method for the rising portion by the detection section 330 will be described later. The detection section 330 supplies the identical object identified from the two or more images to the distance calculation section 340, and supplies information indicating whether a rising portion is detected in the identical object to the determination section 350.

Based on the amounts of parallax of the two or more images, the distance calculation section 340 calculates distances to the identical object. For example, based on the shift amounts of a center portion of the identical object in the height direction in the two or more images, the distance calculation section 340 calculates distance from the moving vehicle 1 to the identical object. The distance calculation section 340 supplies the calculated distance to the determination section 350.

Based on the detection result as to whether the identical object has a rising portion, the determination section 350 determines whether the identical object is an obstacle. For example, among identical objects as obstacle candidates in the two or more images, the determination section 350 determines an identical object having a rising portion of a predetermined height or more to be an obstacle. The determination section 350 supplies the determination result to the output section 360.

The output section 360 outputs the determination result by the determination section 350. For example, the output section 360 may display the detected obstacle on a display of the moving vehicle 1 to warn passengers of the presence of the obstacle.

Thus, in addition to/instead of the parallax of an identical object in the images of the two or more imaging devices 20 and 22 provided at different heights, the detecting device 30 uses a difference in terms of the length of the identical object in the height direction to determine an obstacle. When the identical object is in the distance, the difference in terms of the length of the identical object in the height direction is easier to detect on the images than the parallax of the identical object. The detecting device 30 can determine whether a distant object is an obstacle to the moving vehicle 1 more accurately than the case of using only the parallax of the identical object. Thus, the detecting device 30 can ensure safe traveling of the moving vehicle 1.

Figure 2:
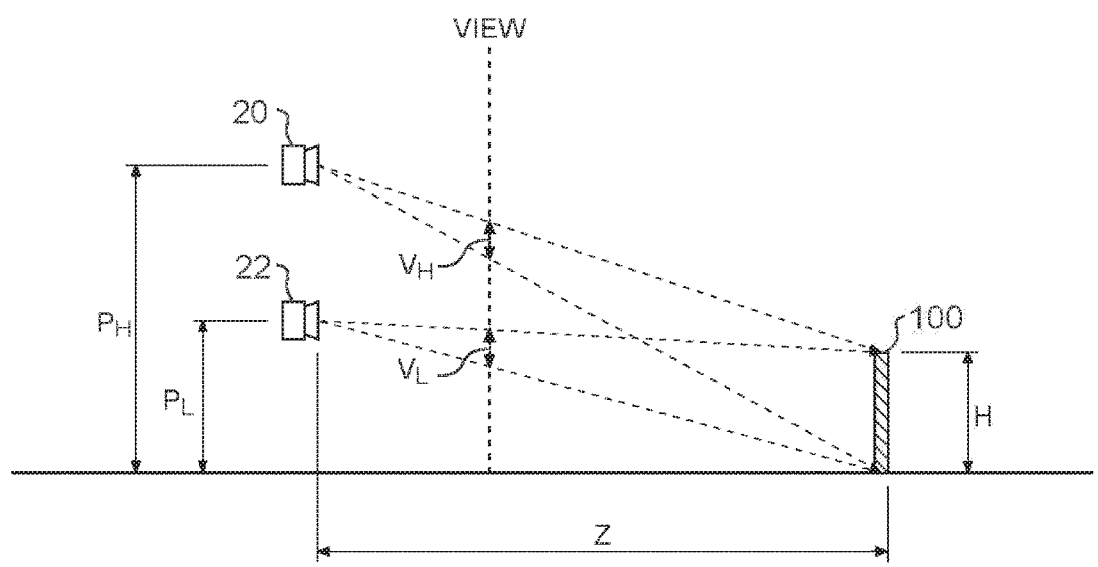
FIG. 2 shows an outline of the detection principle of the detecting device of the embodiment.
Figure 3:
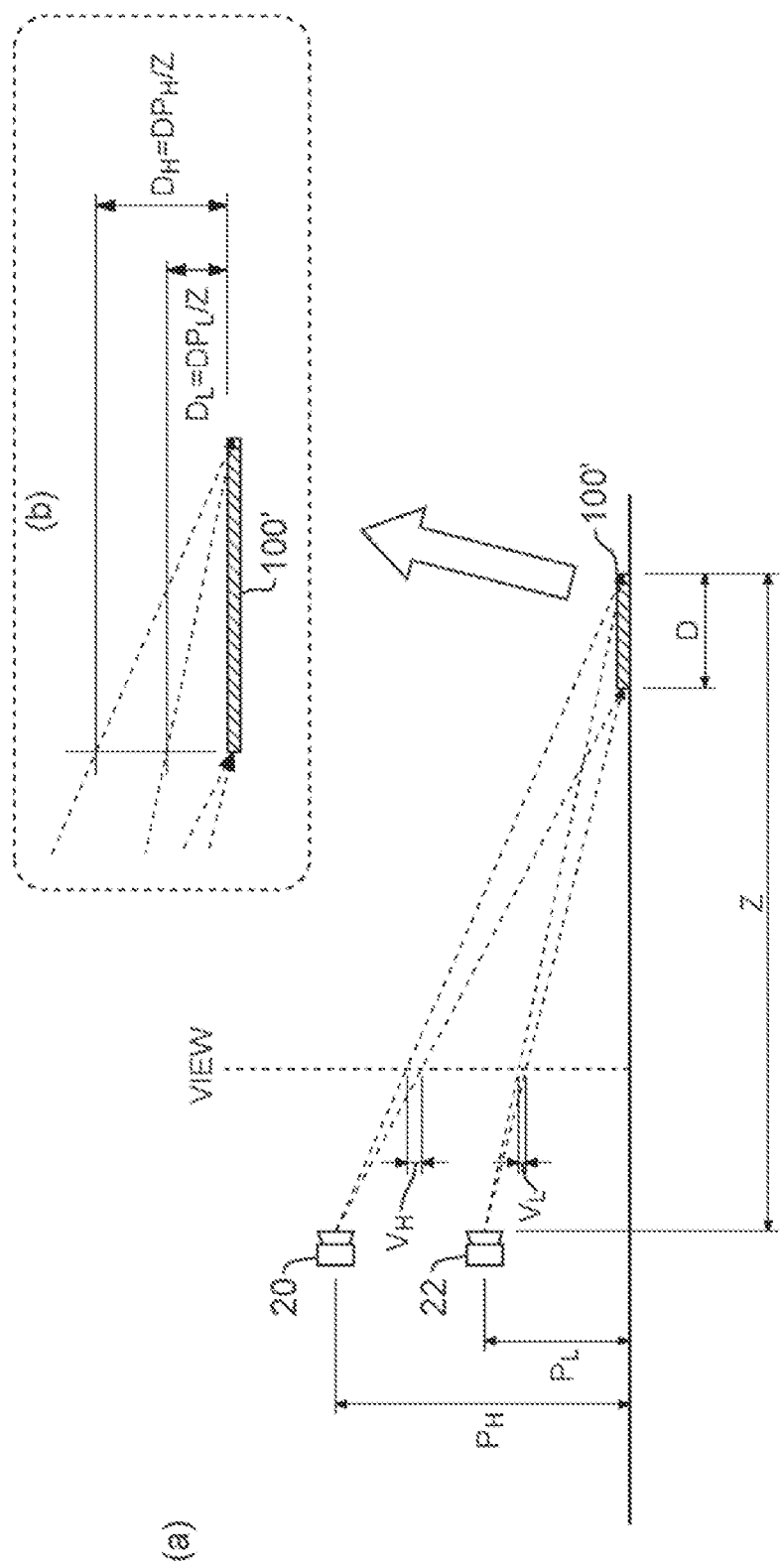
FIG. 3 shows the outline of the detection principle of the detecting device of the embodiment.

FIGS. 2 and 3 show an outline of the detection principle of the detecting device 30 of the embodiment. FIG. 2 shows a state in which the imaging device 20 on a higher position side (height $P_H$) and the imaging device 22 on a lower position side (height $P_L$, where $P_L<P_H$) capture an identical object 100 having an upright height H (e.g., perpendicular to the ground, the imaging device 20, or the like). In the figures, the length of the identical object 100 in the height direction in the image of the imaging device 20 is denoted by $V_H$, and the length of the identical object 100 in the height direction in the image of the imaging device 22 is denoted by $V_L$.

In the images of the imaging device 20 and the imaging device 22, the length $V_H$ and the length $V_L$ are almost the same length. In other words, when the object 100 a rising portion toward the moving vehicle 1, the lengths of images of the identical object 100 in the height direction in the two or more images become almost the same.

FIG. 3A shows a state in which the imaging device 20 on the higher position side (height $P_H$) and the imaging device 22 on the lower position side (height $P_L$, where $P_L<P_H$) capture an identical object 100' having a depth D and provided along the horizontal direction (e.g., parallel to the ground or horizontal to the imaging device 20). The length of the identical object 100' in the height direction in the image of the imaging device 20 is denoted by $V_H$, and the length of the identical object 100' in the height direction in the image of the imaging device 22 is denoted by $V_L$.

As shown, the length $V_H$ is longer than the length $V_L$ in the images of the imaging device 20 and the imaging device 22. In other words, in the case where the identical object 100' is arranged horizontally without any rising portion toward the moving vehicle 1, the length in the height direction (vertical direction) when the imaging device 20 on the higher position side captures the identical object 100' is longer than the length captured by the imaging device 22 on the lower position side.

FIG. 3B shows an enlarged view in the vicinity of the identical object 100' in FIG. 3A. As shown, the length $V_H$ is proportional to a length $D_H$ indicated by the right arrow in FIG. 3B and the length $V_L$ is proportional to a length $D_L$ indicated by the left arrow in FIG. 3B. Here, the length $D_H$ is $DP_H/Z$ and the length $D_L$ is $DP_L/Z$. Therefore, the length ratio $V_H:V_L$ of the lengths of the identical object 100' in the height direction in the two or more images becomes equivalent to the height ratio $P_H:P_L$ of the imaging device 20 and the imaging device 22.

For example, when the height ratio of the imaging device 20 and the imaging device 22 is 3:1, the length ratio $V_H:V_L$ in the height direction is also 3:1. When the identical object 100' is in the distance, the parallax of the identical object 100' is likely to be very small like a few pixels or less. However, since the length ratio $V_H:V_L$ is always constant, i.e., 3:1, the rising of the identical object 100' is easier to detect than the parallax.

Therefore, when there is a difference in the two or more images in terms of the length of the identical object in the height direction, the detection section 330 determines that a dominant plane of the identical object lies along a direction approximately parallel to the optical axis of the imaging device 20 and the like (i.e., horizontal direction), and hence determines that the identical object has no rising portion toward the imaging device 20 and the like.

When there is no difference in the two or more images in terms of the length of the identical object in the height direction, the detection section 330 determines that the dominant plane of the identical object lies along a direction approximately vertical to the optical axis of the imaging device 20 and the like (i.e., vertical direction), and hence determines that the identical object has a rising portion toward the imaging device 20 and the like.

Figure 4:
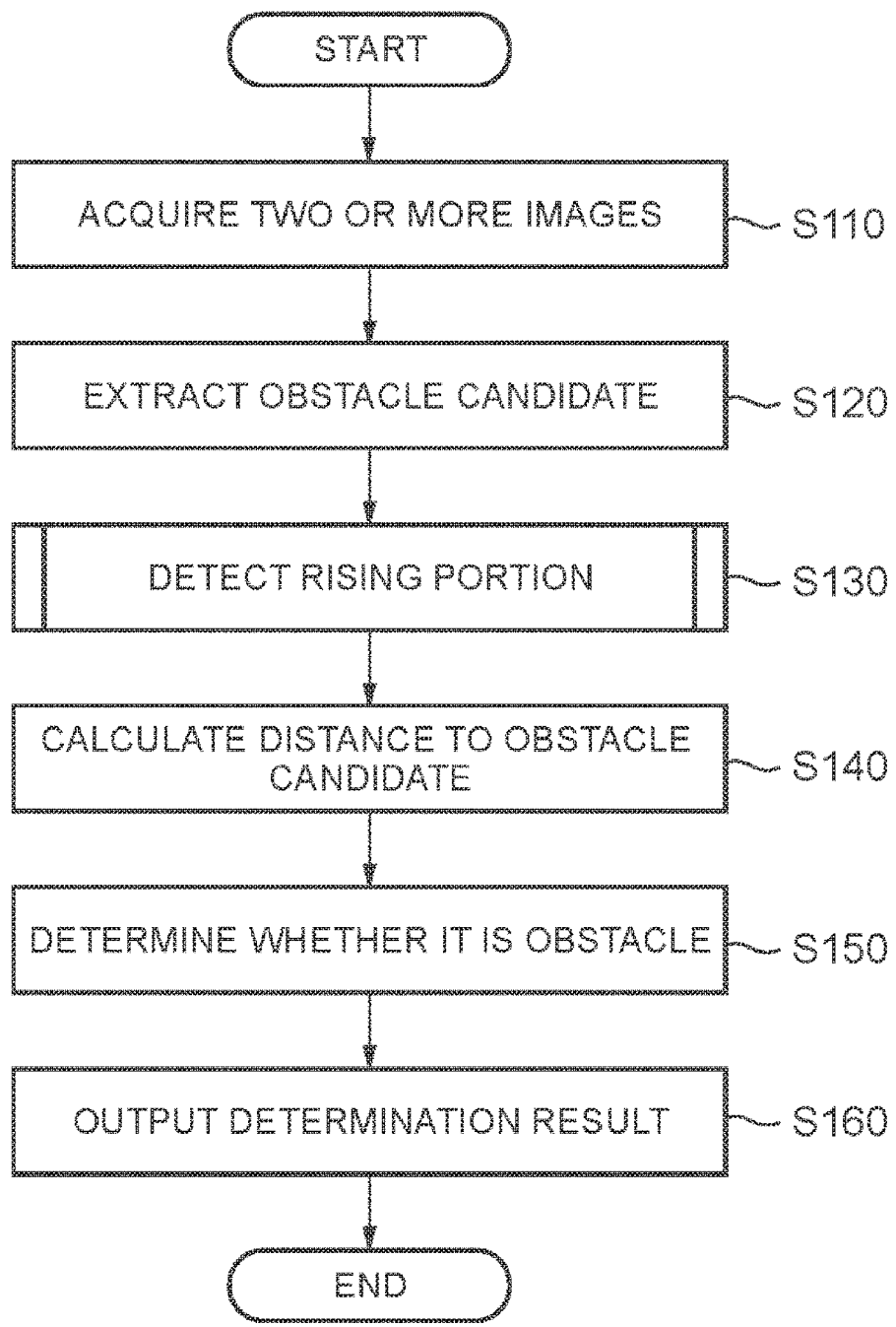
FIG. 4 shows a flow of processing performed by the detecting device of the embodiment.

FIG. 4 shows a flow of processing performed by the detecting device 30 of the embodiment. The detecting device 30 performs processing from S110 to S160 to detect an obstacle to the moving vehicle 1.

First, in S110, the acquisition section 310 acquires two or more images captured by the two or more imaging devices 20 and 22 provided at different heights. For example, the acquisition section 310 acquires digital images captured by the imaging devices 20 and 22, respectively. The acquisition section 310 may acquire video and/or still images from the imaging device 20 and the like.

The acquisition section 310 may acquire two or more images from two or more imaging devices 20 and the like arranged in the vertical direction, or instead of this, it may acquire two or more images from two or more imaging devices 20 and the like arranged in an oblique direction (e.g., a direction oblique to the ground or the imaging device 20 and the like). Further, the acquisition section 310 may acquire two or more images from at least two imaging devices different in height, respectively. The acquisition section 310 supplies the acquired two or more images to the extraction section 320.

Next, in S120, the extraction section 320 extracts an obstacle candidate as the candidate for an obstacle from the two or more images. For example, the extraction section 320 extracts an obstacle candidate from one of the two or more images (e.g., an image from the imaging device 20) using an existing method for automatically extracting a region of interest (ROI).

As an example, the extraction section 320 may divide the image from the imaging device 20 into multiple superpixels (regions, each of which includes multiple pixels and has a predetermined size and shape with the features of the included pixels such as color similar to each other) to extract, as an obstacle candidate, any of the multiple superpixels different by a reference amount or more from surrounding regions in terms of the features such as luminance and/or chromaticity. The extraction section 320 supplies the extracted obstacle candidate to the detection section 330.

Next, in S130, the detection section 330 detects a rising portion of the obstacle candidate. For example, the detection section 330 first identifies an identical object in the two or more images. Specifically, the detection section 330 identifies, as the identical object, a region similar to the extracted obstacle candidate from an image (e.g., an image from the imaging device 22) unused to extract the obstacle candidate in S120 among the two or more images.

After that, based on the length ratio $V_H:V_L$ of the regions corresponding to the identical object in the height direction in the two or more images, and the height ratio $P_H:P_L$ of the two or more imaging devices 20 and the like, the detection section 330 detects a rising portion. The detection section 330 supplies a correspondence relationship between images of the identical object in the two or more images to the distance calculation section 340, and supplies information as to whether a rising portion is detected in the identical object to the determination section 350.

Next, in S140, the distance calculation section 340 calculates distance to the identical object based on the amounts of parallax of the two or more images. For example, the distance calculation section 340 calculates distance from the moving vehicle 1 to the identical object based on the amounts of parallax of the two or more images in the height direction. As an example, the distance calculation section 340 uses the focal lengths and relative positions of the two or more imaging devices, and the parallax of the identical object having the correspondence relationship in the two or more images to calculate distance z from the positions of the imaging devices to the obstacle candidate by triangulation.

When the moving vehicle 1 has two or more imaging devices provided in the horizontal direction (for example, when imaging devices are provided at respective vertices of a triangle having a horizontal base, or the like), the distance calculation section 340 may calculate the distance z to the identical object based on the amounts of parallax of two or more images in the horizontal direction instead of/in addition to the amounts of parallax in the height direction.

Thus, even when the two or more imaging devices 20 and the like cannot be arranged to be sufficiently separated in the longitudinal direction, the imaging devices can be installed to be sufficiently separated in the transverse direction to enable the distance calculation section 340 to obtain parallax images with large amounts of parallax, and hence to calculate the distance z more accurately. The distance calculation section 340 supplies the calculated distance z to the identical object to the determination section 350.

Next, in S150, the determination section 350 determines whether the identical object is an obstacle that obstructs the traveling of the moving vehicle 1. For example, among images of the identical object detected in the two or more images, the determination section 350 selects one having a rising portion. Next, the determination section 350 uses the distance to the selected identical object and the length of the identical object in the height direction, and the focal lengths of the imaging devices to estimate an actual height h of the rising portion. After that, the determination section 350 determines whether the identical object is an obstacle based on the estimated height h. For example, among selected identical objects, the determination section 350 may determine, to be an obstacle, one whose estimated height h is more than or equal to a predetermined threshold value.

Here, an example of specific processing performed by the determination section 350 will be described. First, the determination section 350 uses distance z[m] to the obstacle candidate, the length $V_H$ [pixel] of the obstacle in the height direction in one image, and the focal length f [pixel] of an imaging device that captured the one image to calculate an actual height of the obstacle candidate as $h=zV_H/f$ [m].

Next, the determination section 350 uses the calculated height h to determine whether the obstacle candidate can obstruct the traveling of the moving vehicle 1, i.e., whether it is an obstacle. For example, when $h>T_h$ where a threshold value of the height h is denoted by $T_h$ (e.g., 0.1 [m]), the determination section 350 determines the obstacle candidate to be an obstacle.

Here, the determination section 350 may determine all identical objects having rising portions to be obstacles without using distances calculated by the distance calculation section 340. The determination section 350 supplies the determination result to the output section 360.

Next, in S160, the output section 360 outputs the determination result by the determination section 350. For example, the output section 360 may display the direction of the detected obstacle and/or the distance to the obstacle on a display for passengers of the moving vehicle 1 to warn the passengers of the presence of the obstacle. Further, the output section 360 may display the position of and distance to the obstacle on a head-up display provided in the moving vehicle 1.

Figure 5:
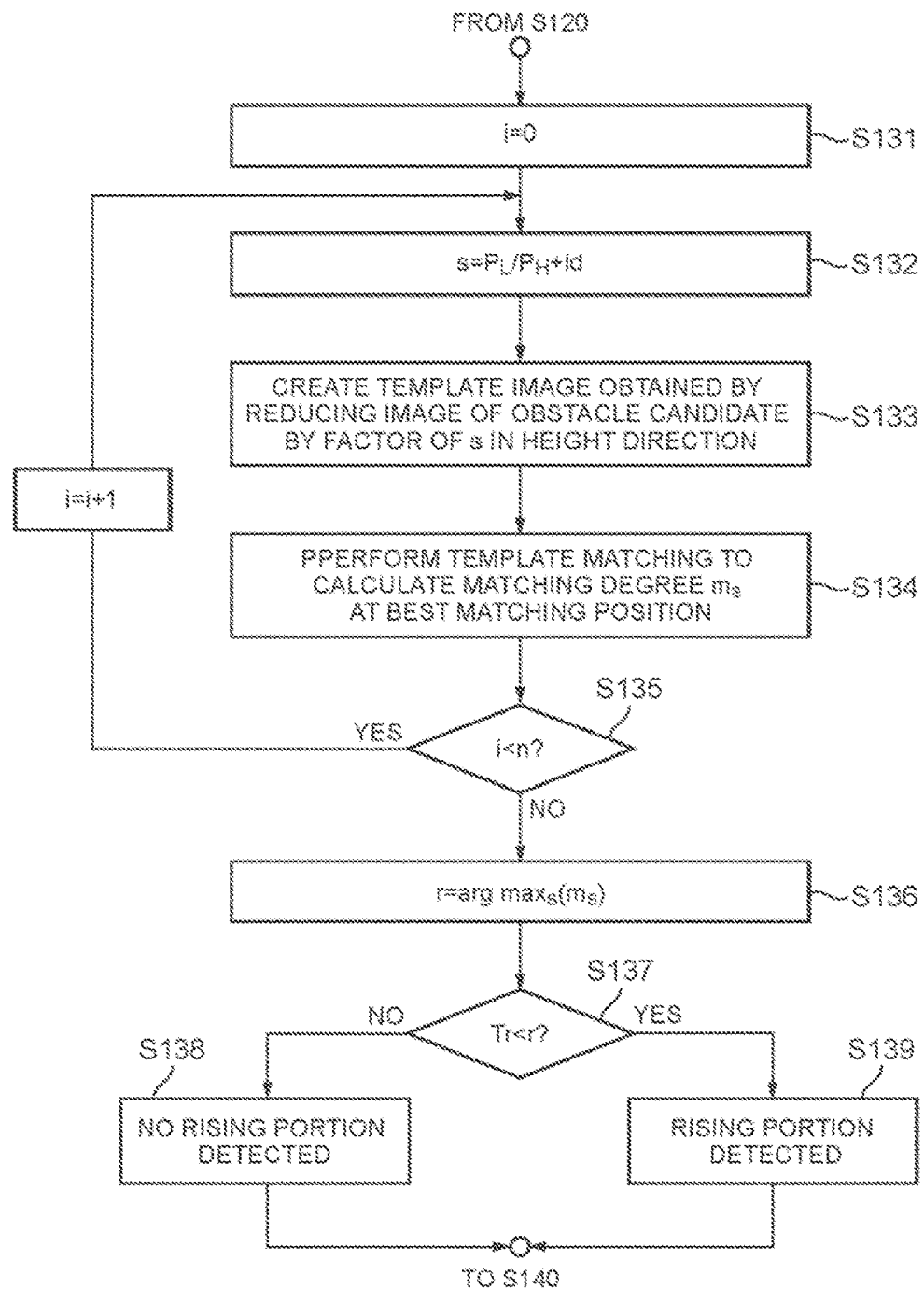
FIG. 5 shows a flow of specific processing in S130 of FIG. 4.

FIG. 5 shows a flow of specific processing in S130 of FIG. 4. The detection section 330 may perform processing from S131 to S139 to perform the processing in S130.

The detection section 330 detects a rising portion based on the length ratio $V_H:V_L$ of images of an identical object in the height direction in the two or more images. To this end, the detection section 330 is first required to identify the identical object in the two or more images. Since it is not easy to identify an identical object in the two or more images, the following will show, as an example, a method of identifying an identical object concurrently with the calculation of the length ratio $r=V_L/V_H$ in the height direction using two images obtained at the same time from two imaging devices.

First, in S131, the detection section 330 sets i=0.

Next, in S132, the detection section 330 generates a magnification s, used to create a template image reduced by the factor of s in the height direction, from an image obtained in the upper imaging device (imaging device 20) based on the image of an obstacle candidate extracted by the extraction section 320. Here, s takes on multiple discrete values including both ends in a range of $[P_L/P_H, 1.0]$, which may be $s=P_L/P_H+i\times d$, for example. For example, i takes a value set by the detection section 330 among integer values of 1 to n−1, and d may be $(1-P_L/P_H)/(n-1)$. Therefore, s takes on n values of $P_L/P_H$, $P_L/P_H+d$, $P_L/P_H+2d$, ..., $P_L/P_H+(n-2)d$, and 1. When i=0 is set, the detection section 330 generates $P_L/P_H$ as the magnification s.

Next, in S133, the detection section 330 uses the magnification s to create a template image reduced by the factor of s in the height direction based on the image of the obstacle candidate extracted by the extraction section 320.

Next, in S134, the detection section 330 performs template matching of the template image reduced by the factor of s mentioned above with another image obtained in the lower imaging device (imaging device 22) in S120 among the two or more images to calculate a matching score $m_s$ with the template image at the best matching position in the other image.

In the above template matching in S134, the detection section 330 scans the template image over the whole of the other image to calculate a matching score at each position. After calculating matching scores over the whole image, the detection section 330 detects such a position that the matching score is the highest and sets the matching score as $m_s$. Here, the detection section 330 may use normalized cross-correlation or SSD (Sum of Squared Difference) to calculate the matching score.

In S135, the detection section 330 determines whether i<n. When determining i<n, the detection section 330 adds 1 to i, and the procedure returns to S132. Thus, the detection section 330 performs the generation of the magnification s and template matching on n ways of s in processing from S132 to S134 to calculate a magnification giving the maximum matching score among multiple magnification candidates by using each of multiple template images. When the detection section 330 does not determine i<n, the procedure proceeds to S136.

After that, in S136, the detection section 330 calculates $r=\arg\max_s(m_s)$ to calculate a value of the magnification s giving the maximum $m_s$ as the length ratio r in the height direction. The value of r indicates a ratio of the length $V_L$ of a region corresponding to the identical object in the height direction in an image captured from a lower position to the length $V_H$ of a region corresponding to the identical object in the height direction in an image captured from a higher position, which becomes $V_H:V_L=1:r$.

Next, in S137, the detection section 330 determines whether the obstacle candidate has a rising portion based on r and a predetermined threshold value. For example, when a threshold value of r is denoted by $T_r$, the detection section 330 determines whether $r>T_r$. For example, the detection section 330 may use $T_r=(1+P_L/P_H)/2$ as the threshold value $T_r$. When the detection section 330 determines that $r>T_r$, the procedure proceeds to S139, while if not, the procedure proceeds to S138.

In S138, the detection section 330 does not detect any rising portion.

In S139, the detection section 330 determines that the obstacle candidate corresponding to the identical object has a rising portion as shown in FIG. 2. The detection section 330 supplies, to the distance calculation section 340, a correspondence relationship between images of the identical object in the two or more images in terms of the obstacle candidate determined to have a rising portion.

Thus, when the ratio r, of the length of the region corresponding to the identical object in the height direction in the image captured from the lower position to the length of the region corresponding to the identical object in the height direction in the image captured from the higher position, is larger than the predetermined threshold value $T_r$, the detection section 330 detects a rising portion of the identical object as the obstacle candidate toward the imaging device 20 and the like.

In the template matching in S133, the detection section 330 may limit the range (search range) of scanning the template image in another image to a range near an epipolar line, rather than the whole image, to identify the identical object in the two or more images more accurately. For example, the detection section 330 may set, as the search range, a region spreading a predetermined distance from the epipolar line in the other image.

The epipolar geometry used here is a geometric constraint based on the fact that the relative position of two imaging devices is known, meaning such a constraint that the center point of an identical object captured on one image is constrained onto a straight line passing through an epipole on another image. For example, when two imaging devices arranged in the vertical direction are used, a line extending vertically on one image in the same horizontal position as the center of an obstacle candidate on another image is the epipolar line.

Figure 6:
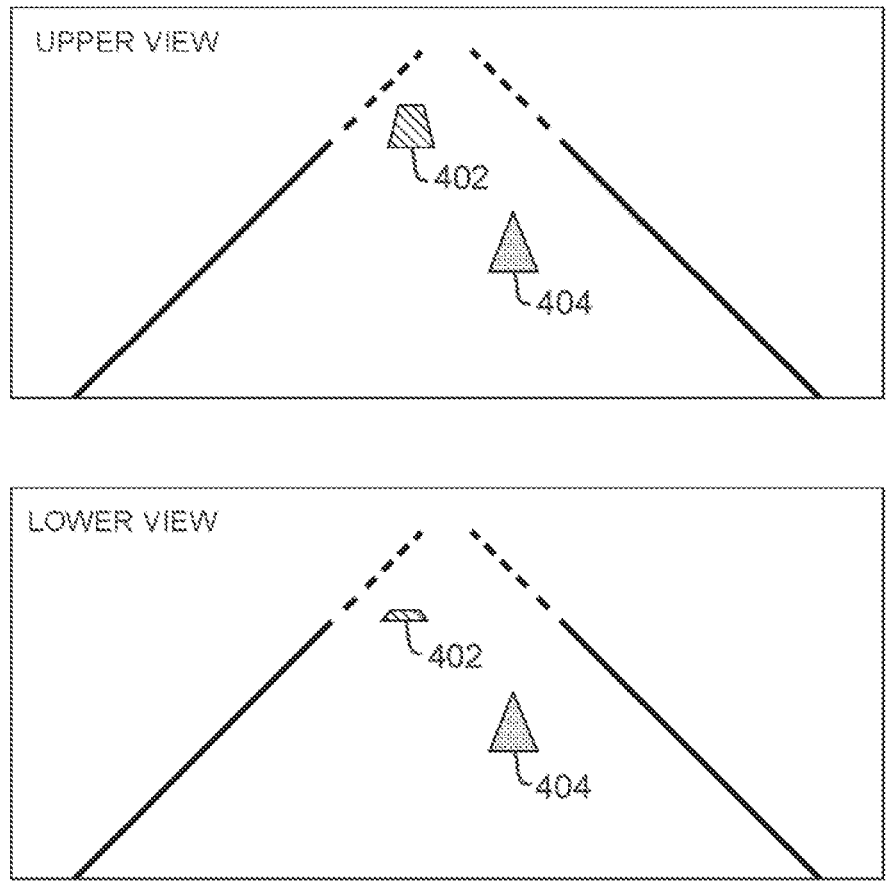

FIG. 6 shows an example of the two or more images captured by the two or more imaging devices 20 and 22. Here, an image captured by the imaging device 20 on the higher position side is shown as an upper view, and an image captured by the imaging device 22 on the lower position side is shown as a lower view. An obstacle candidate 402 and an obstacle candidate 404 as identical objects located on a road are contained in both images.

The obstacle candidate 402 is long in the height direction (in the vertical direction in FIG. 6) in the upper view, but short in the height direction in the lower view. Therefore, the detecting device 30 detects the obstacle candidate 402 as an object along the horizontal direction as shown in FIG. 3. Since the object along the horizontal direction is considered as a traffic sign painted on the road surface or the like, the object is likely not to obstruct the traveling of the moving vehicle 1.

On the other hand, the length of the obstacle candidate 404 in the height direction in the upper view is nearly equal to the length in the height direction in the lower view. Therefore, the detecting device 30 detects the obstacle candidate 404 as a rising object as shown in FIG. 2. Since the obstacle candidate 404 is considered as an object having a height and left on the road, the obstacle candidate 404 is an obstacle to the traveling of the moving vehicle 1.

In addition to the case where an object is expressed as either an upright object or an object along the horizontal direction, a case where an object having a tilt therebetween is considered will be described below as a variation of the aforementioned embodiment.

In the variation, the detecting device 30 may perform processing in S110 and S120 by the acquisition section 310 and the extraction section 320 in the same manner as in the aforementioned embodiment.

In the variation, the detection section 330 may perform processing in S130 including S131 to S136 in the same manner as in the aforementioned embodiment to identify an identical object in the two or more images and calculate the length ratio r in the height direction. Next, the detection section 330 supplies, to the distance calculation section 340, a correspondence between images of the identical object in the two or more images. Further, the detection section 330 supplies the length ratio r in the height direction to the determination section 350. In the variation, the detection section 330 does not determine whether the identical object has a rising portion.

The distance calculation section 340 may perform processing in S140 in the same manner as in the aforementioned embodiment.

In S150, the determination section 350 uses the length ratio r between images of the identical object in the height direction in the two or more images, the distance z, and the positions $P_H$ and $P_L$ of the imaging devices in the height direction to determine whether the identical object is an obstacle. For example, when the length ratio r (the magnification s giving the maximum matching score calculated in S136) is larger than a threshold value based on the distance to the identical object, the determination section 350 may determine that the identical object is an obstacle. The principle of an obstacle determination in consideration of an angle θ of the identical object in the variation will be described later. Next, the determination section 350 supplies the determination result to the output section 360.

The output section 360 may perform processing in the same manner as in S160.

Figure 7:
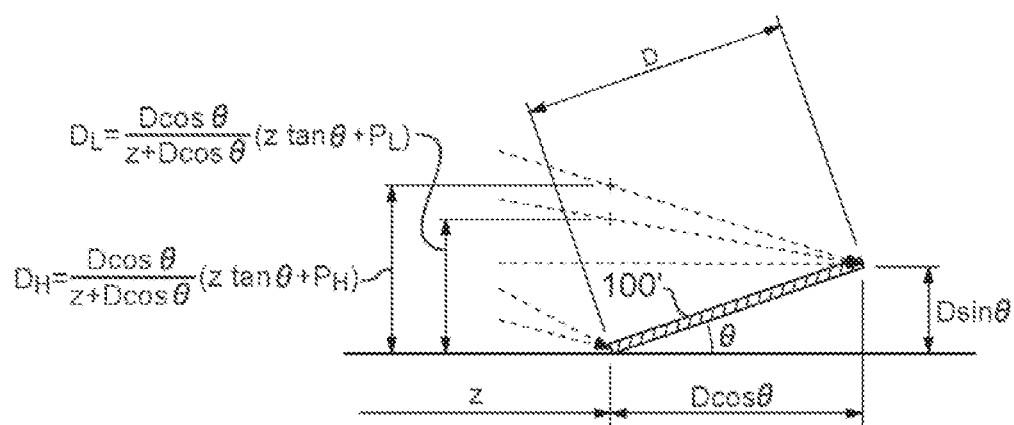
FIG. 7 shows an outline of an obstacle determination when there is a rising angle according to a variation of the embodiment.

FIG. 7 shows an outline of the obstacle determination made by the determination section 350 according to the variation corresponding to FIG. 3B. As shown, an identical object 100' has a tilt angle θ. In this case, the height $V_H$ corresponding to the identical object in an image captured from the higher position is proportional to $D_H$ in FIG. 7, having a relation as $V_H=\alpha D_H$. Further, the height $V_L$ corresponding to the identical object in an image captured from the lower position is proportional to $D_L$, having a relation as $V_L=\alpha D_L$. Here, a is a proportionality coefficient, and $D_H$=D cos θ(z tan θ+$P_L$)/(z+cos θ) and $D_L$=D cos θ(z tan θ+$P_H$)/(z+cos θ).

In this case, the length ratio between images of the identical object in the height direction is r=$V_L/V_H$=(z tan θ+$P_L$)/(z tan θ+$P_H$), monotonically increasing with respect to the angle θ. When angle θ=ψ or more is determined to be an obstacle, the threshold value of r is set to $T_r$=(z tan ψ+$P_L$)/(z tan ψ+$P_H$). The determination section 350 uses the distance z, and the positions $P_H$ and $P_L$ of the imaging devices in the height direction to set the threshold value $T_r$ based on the distance z to the identical object, and when r>$T_r$, the determination section 350 determines that the identical object is an obstacle. As mentioned above, the threshold value $T_r$ takes a different value according to the distance z in the variation.

Thus, the detecting device 30 of the variation determines whether the identical object 100' is an obstacle based on the threshold value $T_r$ defined using the lengths $V_H$ and $V_L$ of the images of the identical object 100' in the height direction in the two or more images, the heights of installation positions of the two or more imaging devices, and the distances to and angle reference values of the identical object 100'. This enables the detecting device 30 of the variation to detect the presence of an obstacle even when the obstacle rises at a certain angle and this can ensure the safe traveling of the moving vehicle 1.

In the embodiment and the variation, it is sufficient to provide the imaging device 20 and the imaging device 22 at different heights, but it is preferred that the height ratio should be larger to make it easy for the detection section 330 to detect a rising portion in order to improve detection accuracy. For example, it is preferred that the height ratio $P_H$:$P_L$ between the imaging device 20 and the imaging device 22 should be 3:1 or more.

In the above description, the detecting device 30 detects an obstacle to the moving vehicle 1, which exists on a road or the like, but the detection target of the detecting device 30 is not limited thereto. The detecting device 30 may use the described methods of the embodiment and the variation to detect whether an object on a surface around the detecting device 30, such as on the ground, on a wall, or on a ceiling, rises from the surface. For example, the detecting device 30 may use images from two or more imaging devices installed vertically from a wall surface to detect an object having a portion rising vertically from the wall.

Figure 8:
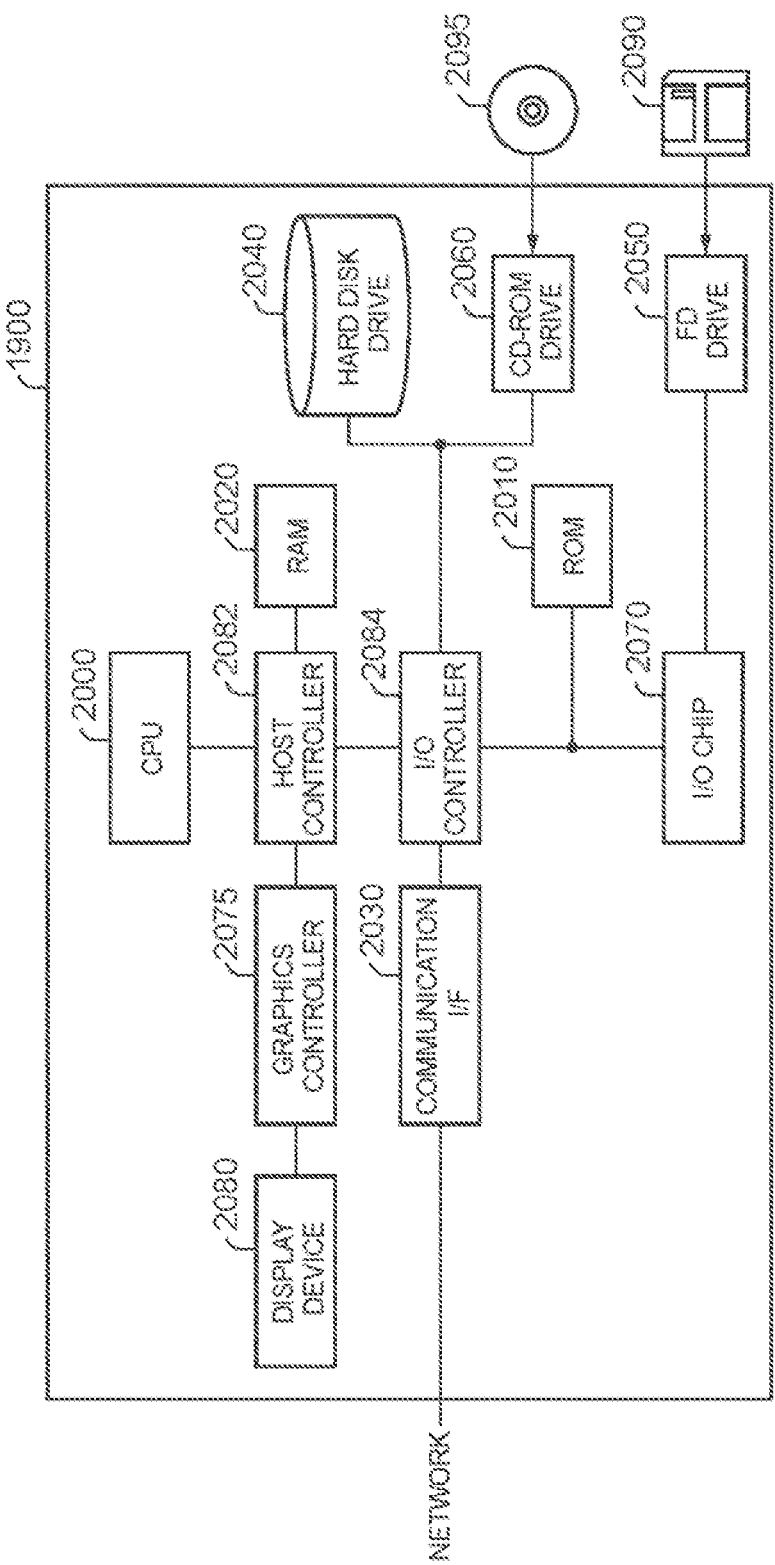
FIG. 8 shows an example of the hardware configuration of a computer.

FIG. 8 shows an example of the hardware configuration of a computer 1900 functioning as the detecting device 30. The computer 1900 according to the embodiment includes: a CPU peripheral section having a CPU 2000, a RAM 2020, a graphics controller 2075, and a display device 2080, which are interconnected by a host controller 2082; an I/O section having a communication interface 2030, a hard disk drive 2040, and a CD-ROM drive 2060, which are connected to the host controller 2082 through an I/O controller 2084; and a legacy I/O section having a ROM 2010, a flexible disk drive 2050, and an I/O chip 2070 connected to the I/O controller 2084.

The host controller 2082 connects the RAM 2020 with the CPU 2000 and the graphics controller 2075, which access the RAM 2020 at a high transfer rate. The CPU 2000 operates based on programs stored in the ROM 2010 and the RAM 2020 to control each section. The graphics controller 2075 acquires image data generated on a frame buffer provided in the RAM 2020 by the CPU 2000 or the like, and displays the image on the display device 2080. Alternatively, the graphics controller 2075 may include therein a frame buffer for storing image data generated by the CPU 2000 or the like.

The I/O controller 2084 connects the host controller 2082 with the communication interface 2030, the hard disk drive 2040, and the CD-ROM drive 2060 as relatively high-speed I/O units. The communication interface 2030 communicates with other apparatuses through a network by wire or radio. Further, the communication interface functions as hardware for performing communication. The hard disk drive 2040 stores programs and data used by the CPU 2000 in the computer 1900. The CD-ROM drive 2060 reads a program or data from a CD-ROM 2095 and provides the read program or data to the hard disk drive 2040 through the RAM 2020.

Also connected to the I/O controller 2084 are relatively low-speed I/O units, i.e., the ROM 2010, the flexible disk drive 2050, and the I/O chip 2070. The ROM 2010 stores a boot program executed when the computer 1900 starts, and/or programs and the like depending on the hardware of the computer 1900. The flexible disk drive 2050 reads a program or data from a flexible disk 2090, and provides the program or data to the hard disk drive 2040 through the RAM 2020. The I/O chip 2070 connects not only the flexible disk drive 2050 to the I/O controller 2084, but also various I/O devices to the I/O controller 2084 through a parallel port, a serial port, a keyboard port, and a mouse port, for example.

A program provided to the hard disk drive 2040 through the RAM 2020 is provided by a user in the form of being stored on a recording medium, such as the flexible disk 2090, a CD-ROM 2095, or an IC card. The program is read from the recording medium, installed in the hard disk drive 2040 within the computer 1900 through the RAM 2020, and executed by the CPU 2000.

Programs installed on the computer 1900 to cause the computer 1900 to function as the detecting device 30 include an acquisition module, an extraction module, detection module, a distance calculation module, a determination module, and an output module. These programs or modules may work on the CPU 2000 and the like to cause the computer 1900 to function as the acquisition section 310, the extraction section 320, the detection section 330, the distance calculation section 340, the determination section 350, and the output section 360, respectively.

Information processes described in these programs are read into the computer 1900 to function as specific means implemented by software in corporation with the above-mentioned various hardware resources, i.e., as the acquisition section 310, the extraction section 320, the detection section 330, the distance calculation section 340, the determination section 350, and the output section 360. Then, information is computed or processed by the specific means depending on the intended use of the computer 1900 in the embodiment to build a specific detecting device 30 according to the intended use.

As an example, when the computer 1900 communicates with an external device or the like, the CPU 2000 executes a communication program loaded on the RAM 2020 to instruct the communication interface 2030 to perform communication processing based on the processing content described in the communication program. Under the control of the CPU 2000, the communication interface 2030 reads send data stored in a send buffer area or the like provided in a storage device, such as the RAM 2020, the hard disk drive 2040, the flexible disk 2090, or the CD-ROM 2095, to send the data to a network, or writes receive data received from the network to a receive buffer area provided in the storage device. Thus, the communication interface 2030 may transfer data exchanged with the storage device by the DMA (Direct Memory Access) method. Alternatively, the CPU 2000 may read data from the storage device or the communication interface 2030 as a source, and write the data to the communication interface 2030 or the storage device as a destination to transfer the send/receive data.

Further, the CPU 2000 reads, into the RAM 2020, all or necessary parts from files or databases stored in an external storage device, such as the hard disk drive 2040, the CD-ROM drive 2060 (CD-ROM 2095), or the flexible disk drive 2050 (flexible disk 2090), by means of DMA transfer or the like to perform various processing on the data on the RAM 2020. Then, the CPU 2000 saves the processed data back to the external storage device by means of DMA transfer or the like. In such processing, the RAM 2020 can be considered to temporarily hold the content of the external storage device. Therefore, in the embodiment, the RAM 2020, the external storage device, and the like are collectively referred to as the memory, the storage section, the storage device, or the like.

For example, a storage section of the detecting device 30 may store data received/provided thereto from the acquisition section 310, the extraction section 320, the detection section 330, the distance calculation section 340, the determination section 350, and the output section 360 accordingly. For example, the storage section may receive and store data input from the acquisition section 310. Further, the storage section may store the result detected by the detection section 330 and the result output by the output section 360.

In the description of the embodiment, when it is described that information (e.g., two or more images) is supplied from one component (e.g., the acquisition section 310) to another component (e.g., the extraction section 320), it may include not only a case where the information is passed directly from the one component to the other component, but also a case where the information is passed after the information is stored in and read from the storage section.

Various programs and various kinds of information, such as data, tables, and databases, in the embodiment are stored in such a storage device as targets of information processing. Note that the CPU 2000 can also hold part of the content of the RAM 2020 in a cache memory to perform reading and writing on the cache memory. Even in such a form, since the cache memory serves as part of the function of the RAM 2020, the cache memory shall be included in the RAM 2020, the memory, and/or the storage device in the embodiment unless otherwise denoted distinctively.

Further, the CPU 2000 performs various processing on the data read from the RAM 2020 as specified in a sequence of instructions of a program including various arithmetic operations, information processing, conditional determinations, and searching and replacing information described in the embodiment, and saves the processed data back to the RAM 2020. For example, when a conditional determination is made, the CPU 2000 compares any of various variables shown in the embodiment with any other variable or constant to determine whether it meets a condition, such as larger, smaller, not less than, not more than, or equal to, and when the condition is satisfied (or unsatisfied), the procedure branches to a different sequence of instructions or calls a subroutine.

Further, the CPU 2000 can retrieve information stored in a file or a database in the storage device. For example, when two or more entries are stored in the storage device in such a manner to associate the attribute value of a second attribute with the attribute value of a first attribute, the CPU 2000 searches the two or more entries stored in the storage device for an entry with the attribute value of the first attribute matching with a specified condition to read the attribute value of the second attribute stored in the entry so that the attribute value of the second attribute associated with the first attribute that meets the predetermined condition can be obtained.

While the present invention has been described with reference to the embodiment, the technical scope of the present invention is not limited to the description of the aforementioned embodiment. It will be obvious to those skilled in the art that various changes or modifications can be added to the aforementioned embodiment. From the appended claims, it will also be obvious that forms to which such changes or modifications are added shall be included in the technical scope of the present invention.

The execution sequence of processes, such as operations, procedures, steps, and stages in the device, system, program, and method described in the appended claims and the specification, and shown in the accompanying drawings are not particularly specified as "ahead of," "prior to," or the like. It should be noted that the processes can be carried out in any order unless output of the previous process is used in the subsequent process. Even when the description is made using "first," "next," and the like in the appended claims, the specification, and the operation flows in the drawings for convenience sake, it does not mean that it is imperative to carry out the processes in this order.

REFERENCE SIGNS LIST 1 moving vehicle, 20 imaging device, 22 imaging device, 30 detecting device, 100 identical object, 310 acquisition section, 320 extraction section, 330 detection section, 340 distance calculation section, 350 determination section, 360 output section, 1900 computer, 2000 CPU, 2010 ROM, 2020 RAM, 2030 communication interface, 2040 hard disk drive, 2050 flexible disk drive, 2060 CD-ROM drive, 2070 I/O chip, 2075 graphics controller, 2080 display device, 2082 host controller, 2084 I/O controller, 2090 flexible disk, 2095 CD-ROM

The invention claimed is:

1. A detecting device comprising:
an acquisition section for acquiring a plurality of images obtained at a same time from a plurality of imaging devices provided at different heights; and
a detection section for detecting a rising portion of an identical object toward the imaging devices based on a difference between lengths of the identical object in a height direction in the plurality of images;
wherein the detection section detects the rising portion based on a length ratio between regions corresponding to the identical object in the height direction in the plurality of images;
wherein the detecting device further comprises:
an extraction section for extracting, from the plurality of images obtained at a same time from the plurality of imaging devices, an obstacle candidate as a candidate for an obstacle;
wherein the extraction section is configured to:
divide one of the plurality of images into a plurality of regions, each region comprising a plurality of pixels and having a predetermined size and shape;
extract as a candidate obstacle, each of the plurality of regions that differs from surrounding regions by more than a reference amount; and
identify, as the identical object, a region similar to the extracted candidate obstacle from one of the plurality of images not used to extract the candidate obstacle;
a distance calculation section for calculating distance to an identical object corresponding to the obstacle candidate based on amounts of parallax of the plurality of images in the height direction and in a longitudinal direction using the focal lengths and relative positions of the plurality of imaging devices, at least three of the plurality of imaging devices located at respective vertices of a triangle having a horizontal base; and
a determination section for determining whether the identical object is an obstacle;
wherein the detection section generates a plurality of template images obtained by reducing an image of the obstacle candidate included in one image of the plurality of images at each of a plurality of magnification candidates, performs template matching using each of the plurality of template images on another image of the plurality of images, calculates a matching score at a best matching position in the other image, and calculates a magnification giving a maximum matching score from among the plurality of magnification candidates;
wherein a value of the calculated magnification indicates a ratio of the length of the identical object in the height direction in a first image captured from a lower position to the length of the identical object in the height direction in a second image captured from a higher position;
wherein, on condition that the value of the magnification giving the maximum matching score is larger than a threshold value based on distance to the identical object, the determination section determines the identical object to be an obstacle; and
an output section configured to display a direction of the determined obstacle and the distance to the determined obstacle on a display.

* * * * *